(12) United States Patent
Kosoy et al.

(10) Patent No.: US 10,861,174 B2
(45) Date of Patent: Dec. 8, 2020

(54) SELECTIVE 3D REGISTRATION

(71) Applicant: MANTISVISION LTD., Petach Tikva (IL)

(72) Inventors: Vadim Kosoy, Petach Tikva (IL); Dani Daniel, Haifa (IL)

(73) Assignee: MANTISVISION LTD., Petach Tikva (IL)

( * ) Notice: Subject to any disclaimer, the term of this patent is extended or adjusted under 35 U.S.C. 154(b) by 0 days.

(21) Appl. No.: 15/822,157

(22) Filed: Nov. 26, 2017

(65) Prior Publication Data

US 2018/0330514 A1      Nov. 15, 2018

Related U.S. Application Data

(63) Continuation of application No. 14/786,977, filed as application No. PCT/IL2014/050391 on Apr. 30, 2014, now abandoned.

(60) Provisional application No. 61/817,502, filed on Apr. 30, 2013, provisional application No. 61/817,496, filed on Apr. 30, 2013.

(51) Int. Cl.

| | | |
|---|---|---|
| *G06K 9/00* | (2006.01) |
| *G06T 7/33* | (2017.01) |
| *H04N 13/275* | (2018.01) |
| *G06T 17/00* | (2006.01) |
| *G06T 3/00* | (2006.01) |
| *G06T 7/30* | (2017.01) |
| *G06T 7/40* | (2017.01) |
| *G06T 19/20* | (2011.01) |

(52) U.S. Cl.
CPC .......... *G06T 7/344* (2017.01); *G06T 3/0068* (2013.01); *G06T 7/30* (2017.01); *G06T 7/40* (2013.01); *G06T 17/00* (2013.01); *G06T 19/20* (2013.01); *H04N 13/275* (2018.05); *G06T 2200/04* (2013.01); *G06T 2207/10028* (2013.01)

(58) Field of Classification Search
None
See application file for complete search history.

(56) References Cited

U.S. PATENT DOCUMENTS

| | | |
|---|---|---|
| 7,139,409 B2 | 11/2006 | Paragios et al. |
| 8,090,194 B2 | 1/2012 | Gordon et al. |

(Continued)

FOREIGN PATENT DOCUMENTS

| | | |
|---|---|---|
| WO | WO 2014/178051 A2 | 11/2014 |
| WO | WO 2013/144952 A1 | 11/2016 |

OTHER PUBLICATIONS

International Search Report and Written Opinion issued in PCT/IL2014/050391, dated Oct. 30, 2014.

(Continued)

*Primary Examiner* — Hadi Akhavannik
(74) *Attorney, Agent, or Firm* — Finnegan, Henderson, Farabow, Garrett & Dunner, L.L.P.

(57) ABSTRACT

A sampling and weighting technique is presented. Given a 3D model that is composed out of n separated entities, a set of parameters is obtained for each entity. A weight is calculated for each entity, giving higher weight for entities corresponding to rarer parameters. Entities are assigned to components based on their corresponding parameters. Entities are sampled based on the weights or based on the components. A new 3D model is constructed from the sampled entities.

43 Claims, 3 Drawing Sheets

FIG. 4

(56) References Cited

U.S. PATENT DOCUMENTS

| | | | |
|---|---|---|---|
| 8,538,166 B2 | 9/2013 | Gordon et al. | |
| 9,613,388 B2* | 4/2017 | Loss | G06T 7/12 |
| 2005/0018901 A1* | 1/2005 | Kaufmann | G06T 17/20 |
| | | | 382/154 |
| 2007/0031005 A1 | 2/2007 | Paragios et al. | |
| 2009/0009513 A1 | 1/2009 | Van Den Hengel et al. | |
| 2009/0028442 A1* | 1/2009 | Kimmel | G06K 9/00214 |
| | | | 382/218 |
| 2010/0284607 A1 | 11/2010 | Van Den Hengel et al. | |
| 2012/0177283 A1 | 7/2012 | Wang et al. | |
| 2012/0196679 A1* | 8/2012 | Newcombe | A63F 13/06 |
| | | | 463/36 |
| 2012/0280686 A1* | 11/2012 | White | G01R 33/56341 |
| | | | 324/309 |
| 2012/0306876 A1 | 12/2012 | Shotten et al. | |
| 2012/0314776 A1* | 12/2012 | Shimizu | H04N 19/597 |
| | | | 375/240.25 |
| 2013/0244782 A1 | 9/2013 | Newcombe et al. | |

OTHER PUBLICATIONS

N. Gelfand et al., "Geometrically Stable Sampling for the ICP Algorithm", 2003.

PCT International Preliminary Report on Patentability issued in PCT/IL2014/050391 dated Nov. 3, 2015.

* cited by examiner

SELECTIVE 3D REGISTRATION

TECHNOLOGICAL FIELD

The invention relates to 3D processing and to 3D registration.

BACKGROUND

As is known by those versed in the art, 3D registration involves an attempt to align two or more 3D models, by finding or applying spatial transformations over the 3D models. 3D registration is useful in many imaging, graphical, image processing, computer vision, medical imaging, robotics, and pattern matching applications.

Examples of scenarios were 3D registration involves significant challenges include: a moving 3D camera, or multiple 3D cameras with different positions and directions and generating a plurality of 3D models of a static scene from different viewpoints. In these examples, the 3D registration process may involve recovering the relative positions and directions of the different viewpoints. Recovering the relative positions and directions of the different viewpoints can further enable merging of the plurality of 3D models into a single high quality 3D model of the scene. Alternatively, the recovered positions and directions can be used in a calibration process of a multiple 3D camera system, or to reconstruct the trajectory of a single moving camera.

Another scenario were 3D registration can present some challenges is where a static 3D camera is used to generate a series of 3D models of a moving object or scene. Here, the 3D registration process recovers the relative positions and orientations of the object or scene in each 3D model. Recovering the relative positions and orientations of the object or scene in each 3D model can further enables merging of the plurality of 3D models into a single high quality 3D model of the object or scene. Alternatively, the trajectory of the moving object or scene can be reconstructed.

A moving 3D camera, or multiple moving 3D cameras, capturing 3D images of a scene that may include several moving objects. As an example, consider one or more 3D cameras attached to a vehicle, where the vehicle is moving, the relative positions and orientations of the 3D cameras to the vehicle are changing, and objects in the scene are moving. In the above scenario, the 3D registration results can be used to assemble a map or a model of the environment, for example as input to motion segmentation algorithms, and so forth.

When the 3D registration process involves a pair of 3D models, the goal of the 3D registration process is to find a spatial transformation between the two models. This can include rigid and non-rigid transformations. The two 3D models may include coinciding parts that correspond to the same objects in the real world, and parts that do not coincide, corresponding to objects (or parts of objects) in the real world that are modeled in only one of the 3D models. Removing the non-coinciding parts speeds up the convergence of the 3D registration process, and can improve the 3D registration result. This same principal extends naturally to the case of three or more 3D models.

In addition, the 3D registration may be instable due to the geometry of the 3D models that allows two 3D models to "slide" against each other in regions which do not contain enough information to fully constrain the registration, for example, due to uniformity in the appearance of a surface in a certain direction. In such case, selecting, or increasing the weights of, the parts of the 3D models that do constrain the registration in the unconstrained direction, allows these parts to control the convergence of 3D registration algorithm, may also speed up the convergence of the 3D registration algorithm, and may improve the 3D registration result.

SUMMARY

According to an aspect of the presently disclosed subject matter there is provided a method, a computer implementing a method that include: Given a 3D model that is composed out of n separated entities, a set of parameters is obtained for each entity. A weight can be calculated for each entity, giving higher weight for entities corresponding to rarer parameters. Entities can be assigned to components based on their corresponding parameters. Entities can sample based on the weights or based on the components to obtain a subset of all entities. A new 3D model is constructed from the subset of sampled entities, thereby producing a smaller 3D model. Computations, such as 3D registration, can be performed using the smaller 3D model. This can speed-up the execution of 3D algorithms, while the sampling that preserves entities with rare parameters maintain entities that may have special importance in the execution of the algorithm.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
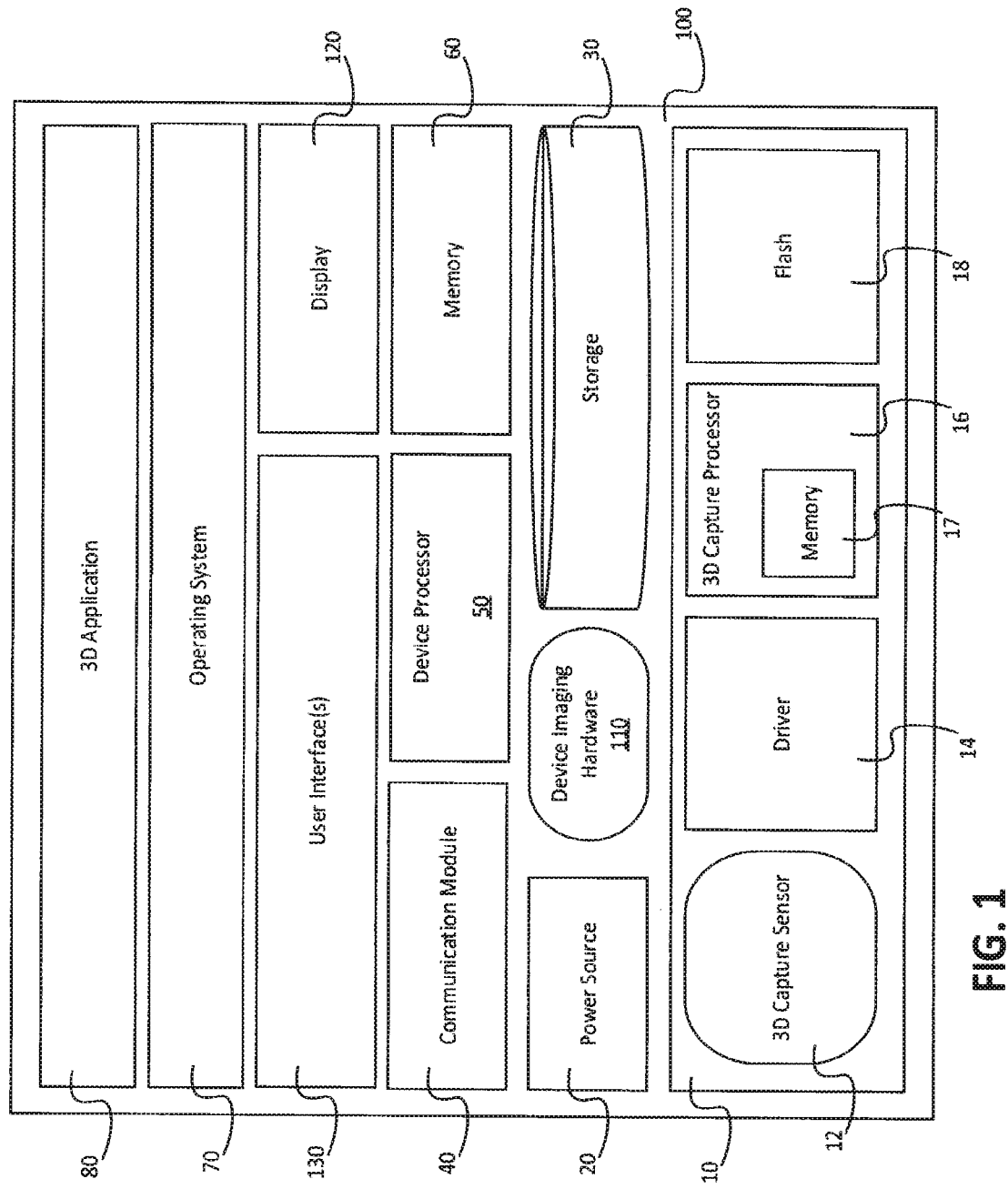
FIG. 1 is a simplified block diagram of an example for one possible implementation of a mobile communication device with 3D capturing capabilities.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION

In the following detailed description, numerous specific details are set forth in order to provide a thorough understanding of the invention. However, it will be understood by those with ordinary skill in the art that the present invention may be practiced without these specific details. In other instances, well-known methods, procedures, and components have not been described in detail so as not to obscure the present invention.

Unless specifically stated otherwise, as apparent from the following discussions, it is appreciated that throughout the specification discussions utilizing terms such as "processing", "calculating", "computing", "determining", "generating", "setting", "configuring", "selecting", "defining", "applying", "obtaining", or the like, include action and/or processes of a computer that manipulate and/or transform data into other data, said data represented as physical quantities, e.g. such as electronic quantities, and/or said data representing the physical objects. The terms "computer", "processor", "controller", "processing unit", and "computing unit" should be expansively construed to cover any kind of electronic device, component or unit with data processing capabilities, including, by way of non-limiting example, a personal computer, a tablet, a smartphone, a server, a computing system, a communication device, a processor (for example, digital signal processor (DSP), and possibly with embedded memory), a microcontroller, a field programmable gate array (FPGA), an application specific integrated circuit (ASIC), a graphics processing unit (GPU), and so on), a core within a processor, any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

In embodiments of the presently disclosed subject matter one or more stages illustrated in the figures may be executed in a different order and/or one or more groups of stages may be executed simultaneously and vice versa. The figures illustrate a general schematic of the system architecture in accordance with an embodiment of the presently disclosed subject matter. Each module in the figures can be made up of any combination of software, hardware and/or firmware that performs the functions as defined and explained herein. The modules in the figures may be centralized in one location or dispersed over more than one location.

The term "3D model" is recognized by those with ordinary skill in the art and refers to any kind of representation of any 3D surface, 3D object, 3D scene, 3D prototype, 3D shape, 3D design and so forth, either static or moving. A 3D model can be represented in a computer in different ways. Some example includes the popular range image, where one associate a depth for pixels of a regular 2D image. Another simple example is the point cloud, where the model consists of a set of 3D points. A different example is using polygons, where the model consists of a set of polygons. Special types of polygon based models include: (i) polygon soup, where the polygons are unsorted; (ii) mesh, where the polygons are connected to create a continuous surface; (iii) subdivision surface, where a sequence of meshes is used to approximate a smooth surface; (iv) parametric surface, where a set of formulas are used to describe a surface; (v) implicit surface, where one or more equations are used to describe a surface; (vi) and so forth. Another example is to represent a 3D model as a skeleton model, where a graph of curves with radii is used. Additional examples include a mixture of any of the above methods. There are also many variants on the above methods, as well as a variety of other methods. It is important to note that one may convert one kind of representation to another, at the risk of losing some information, or by making some assumptions to complete missing information.

The term "3D registration process" is recognized by those with ordinary skill in the art and refers to the process of finding one or more spatial transformations that aligns two or more 3D models, and/or for transforming two or more 3D models into a single coordinate system.

The term "3D registration algorithm" is recognized by those with ordinary skill in the art and refers to any process, algorithm, method, procedure, and/or technique, for solving and/or approximating one or more solutions to the 3D registration process. Some examples for 3D registration algorithms include the Iterative Closest Point algorithm, the Robust Point Matching algorithm, the Kernel Correlation algorithm, the Coherent Point Drift algorithm, RANSAC based algorithms, any graph and/or hypergraph matching algorithm, any one of the many variants of these algorithms, and so forth.

The term "iterative 3D registration algorithm" is recognized by those with ordinary skill in the art and refers to a 3D registration algorithm that repeatedly adjusts an estimation of the 3D registration until convergence, possibly starting from an initial guess for the 3D registration.

The term "3D registration result" is recognized by those with ordinary skill in the art and refers to the product of a 3D registration algorithm. This may be in the form of: spatial transformations between pairs of 3D models; spatial transformations for transforming all the 3D models into a single coordinate system; representation of all the 3D models in a single coordinate system; and so forth.

The term "estimated 3D registration" is recognized by those with ordinary skill in the art and refers to any estimation of 3D registration result. In one example, the estimation may be a random guess for the 3D registration result. In an iterative 3D registration algorithm, each iteration updates an estimation of 3D registration result to obtain a new estimation. A 3D registration result by itself can also be an estimated 3D registration. And so forth.

The term "3D camera" is recognized by those with ordinary skill in the art and refers to any type of device, including a camera and/or a sensor, which is capable of capturing 3D images, 3D videos, and/or 3D models. Examples include: stereoscopic cameras, time-of-flight cameras, obstructed light sensors, structured light sensors, and so forth.

It should be noted that some examples of the presently disclosed subject matter are not limited in application to the details of construction and the arrangement of the components set forth in the following description or illustrated in the drawings. The invention can be capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings.

Similarly, an element that is identified in the text by a numeral that does not appear in the drawing described by the text, has the same use and description as in the previous drawings where it was described.

The drawings in this document may not be to any scale. Different figures may use different scales and different scales can be used even within the same drawing, for example different scales for different views of the same object or different scales for the two adjacent objects.

FIG. 1 is a simplified block diagram of an example for one possible implementation of a mobile communication device with 3D capturing capabilities. The mobile communication device 100 can includes a 3D camera 10 that is capable of providing 3D depth or range data. In the example of FIG. 1 there is shown a configuration of an active stereo 3D camera, but in further examples of the presently disclosed subject matter other known 3D cameras can be used. Those versed in the art can readily apply the teachings provided in the examples of the presently disclosed subject matter to other 3D camera configurations and to other 3D capture technologies.

By way of example, the 3D camera 10 can include: a 3D capture sensor 12, a driver 14, a 3D capture processor 16 and a flash module 18. In this example, the flash module 18 is configured to project a structured light pattern and the 3D capture sensor 12 is configured to capture an image which corresponds to the reflected pattern, as reflected from the environment onto which the pattern was projected. U.S. Pat. No. 8,090,194 to Gordon et. al. describes an example structured light pattern that can be used in a flash component of a 3D camera, as well as other aspects of active stereo 3D capture technology and is hereby incorporated into the present application in its entirety. International Application Publication No. WO2013/144952 describes an example of a possible flash design and is hereby incorporated by reference in its entirety.

By way of example, the flash module 18 can include an IR light source, such that it is capable of projecting IR radiation or light, and the 3D capture sensor 12 can be and IR sensor, that is sensitive to radiation in the IR band, and such that it is capable of capturing the IR radiation that is returned from the scene. The flash module 18 and the 3D capture sensor 12 are calibrated. According to examples of the presently disclosed subject matter, the driver 14, the 3D capture processor 16 or any other suitable component of the mobile communication device 100 can be configured to implement auto-calibration for maintaining the calibration among the flash module 18 and the 3D capture sensor 12.

The 3D capture processor 16 can be configured to perform various processing functions, and to run computer program code which is related to the operation of one or more components of the 3D camera. The 3D capture processor 16 can include memory 17 which is capable of storing the computer program instructions that are executed or which are to be executed by the processor 16.

The driver 14 can be configured to implement a computer program which operates or controls certain functions, features or operations that the components of the 3D camera 10 are capable of carrying out.

According to examples of the presently disclosed subject matter, the mobile communication device 100 can also include hardware components in addition to the 3D camera 10, including for example, a power source 20, storage 30, a communication module 40, a device processor 50 and memory 60, device imaging hardware 110, a display unit 120, and other user interfaces 130. It should be noted that in some examples of the presently disclosed subject matter, one or more components of the mobile communication device 100 can be implemented as distributed components. In such examples, a certain component can include two or more units distributed across two or more interconnected nodes. Further by way of example, a computer program, possibly executed by the device processor 50, can be capable of controlling the distributed component and can be capable of operating the resources on each of the two or more interconnected nodes.

It is known to use various types of power sources in a mobile communication device. The power source 20 can include one or more power source units, such as a battery, a short-term high current source (such as a capacitor), a trickle-charger, etc.

The device processor 50 can include one or more processing modules which are capable of processing software programs. The processing module can each have one or more processors. In this description, the device processor 50 may include different types of processors which are implemented in the mobile communication device 100, such as a main processor, an application processor, etc. The device processor 50 or any of the processors which are generally referred to herein as being included in the device processor can have one or more cores, internal memory or a cache unit.

The storage unit 30 can be configured to store computer program code that is necessary for carrying out the operations or functions of the mobile communication device 100 and any of its components. The storage unit 30 can also be configured to store one or more applications, including 3D applications 80, which can be executed on the mobile communication device 100. In a distributed configuration one or more 3D applications 80 can be stored on a remote computerized device, and can be consumed by the mobile communication device 100 as a service. In addition or as an alternative to application program code, the storage unit 30 can be configured to store data, including for example 3D data that is provided by the 3D camera 10.

The communication module 40 can be configured to enable data communication to and from the mobile communication device. By way of example, examples of communication protocols which can be supported by the communication module 40 include, but are not limited to cellular communication (3G, 4G, etc.), wired communication protocols (such as Local Area Networking (LAN)), and wireless communication protocols, such as Wi-Fi, wireless personal area networking (PAN) such as Bluetooth, etc.

It should be noted that that according to some examples of the presently disclosed subject matter, some of the components of the 3D camera 10 can be implemented on the mobile communication hardware resources. For example, instead of having a dedicated 3D capture processor 16, the device processor 50 can be used. Still further by way of example, the mobile communication device 100 can include more than one processor and more than one type of processor, e.g., one or more digital signal processors (DSP), one or more graphical processing units (GPU), etc., and the 3D camera can be configured to use a specific one (or a specific set or type) processor(s) from the plurality of device 100 processors.

The mobile communication device 100 can be configured to run an operating system 70. Examples of mobile device operating systems include but are not limited to: such as Windows Mobile™ by Microsoft Corporation of Redmond, Wash., and the Android operating system developed by Google Inc. of Mountain View, Calif.

The 3D application 80 can be any application which uses 3D data. Examples of 3D applications include a virtual tape measure, 3D video, 3D snapshot, 3D modeling, etc. It would be appreciated that different 3D applications can have different requirements and features. A 3D application 80 may be assigned to or can be associated with a 3D application group. In some examples, the device 100 can be capable of running a plurality of 3D applications 80 in parallel.

Imaging hardware 110 can include any imaging sensor, in a particular example, an imaging sensor that is capable of capturing visible light images can be used. According to examples of the presently disclosed subject matter, the imaging hardware 110 can include a sensor, typically a sensor that is sensitive at least to visible light, and possibly also a light source (such as one or more LEDs) for enabling image capture in low visible light conditions. According to examples of the presently disclosed subject matter, the device imaging hardware 110 or some components thereof can be calibrated to the 3D camera 10, and in particular to the 3D capture sensor 12 and to the flash 18. It would be appreciated that such a calibration can enable texturing of the 3D image and various other co-processing operations as will be known to those versed in the art.

In yet another example, the imaging hardware 110 can include a RGB-IR sensor that is used for capturing visible light images and for capturing IR images. Still further by way of example, the RGB-IR sensor can serve as the 3D capture sensor 12 and as the visible light camera. In this configuration, the driver 14 and the flash 18 of the 3D camera, and possibly other components of the device 100, are configured to operate in cooperation with the imaging hardware 110, and in the example given above, with the RGB-IR sensor, to provide the 3D depth or range data.

The display unit 120 can be configured to provide images and graphical data, including a visual rendering of 3D data that was captured by the 3D camera 10, possibly after being processed using the 3D application 80. The user interfaces 130 can include various components which enable the user to interact with the mobile communication device 100, such as speakers, buttons, microphones, etc. The display unit 120 can be a touch sensitive display which also serves as a user interface.

According to some examples of the presently disclosed subject matter, any processing unit, including the 3D capture processor 16 or the device processor 50 and/or any sub-components or CPU cores, etc. of the 3D capture processor 16 and/or the device processor 50, can be configured to read 3D images and/or frames of 3D video clips stored in storage unit 30, and/or to receive 3D images and/or frames of 3D video clips from an external source, for example through communication module 40; produce 3D models out of said 3D images and/or frames. By way of example, the produced 3D models can be stored in storage unit 30, and/or sent to an external destination through communication module 40. According to further examples of the presently disclosed subject matter, any such processing unit can be configured to execute 3D registration on a plurality of 3D models.

Figure 2:
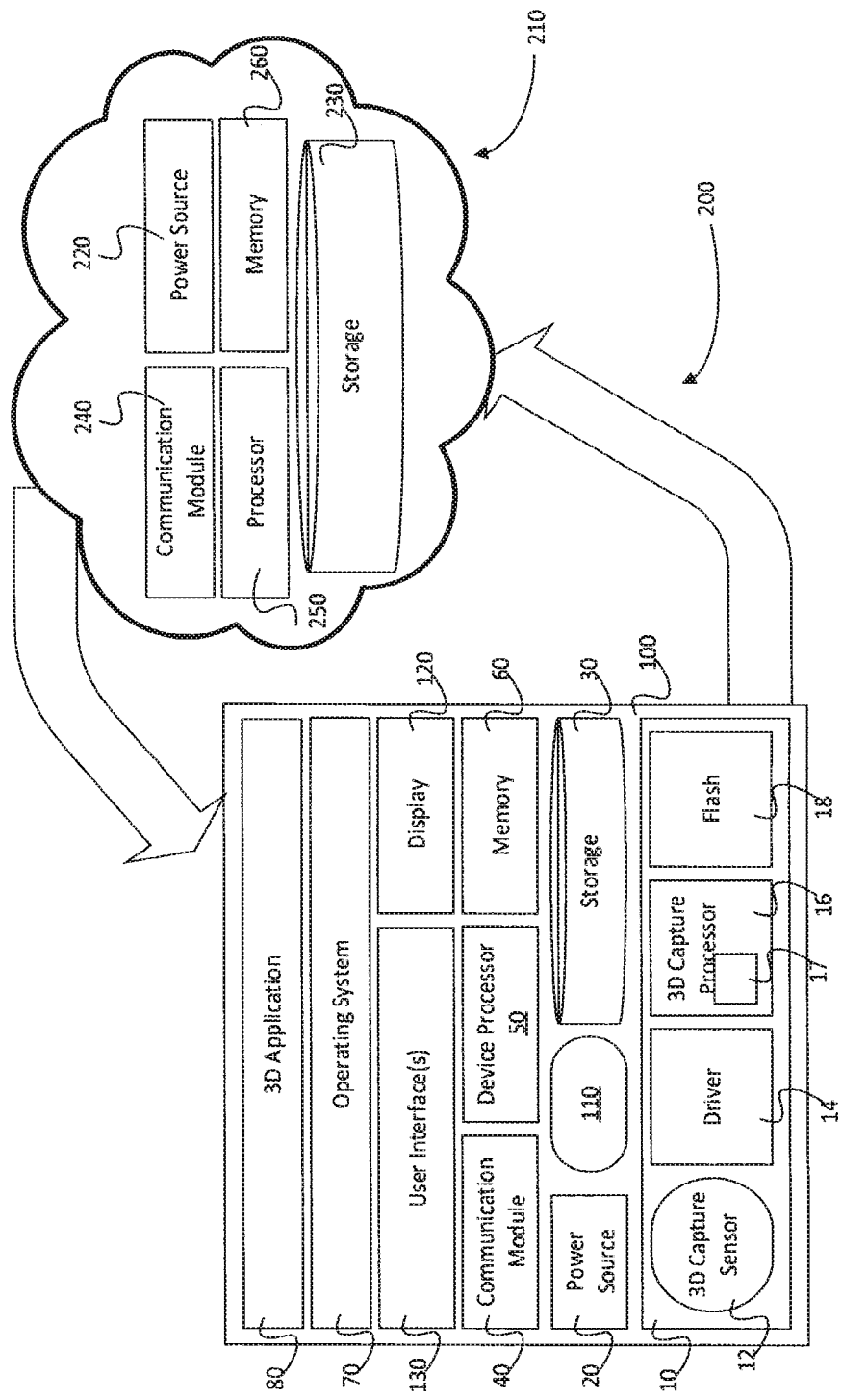
FIG. 2 is a simplified block diagram of an example for one possible implementation of a system that includes a mobile communication device with 3D capturing capabilities and a cloud platform.

FIG. 2 is a simplified block diagram of an example for one possible implementation of a system 200, that includes a mobile communication device with 3D capturing capabilities 100, and a cloud platform 210.

According to examples of the presently disclosed subject matter, the cloud platform 210 can include hardware components, including for example, one or more power sources 220, one or more storage units 230, one or more communication modules 240, one or more processors 250, optionally one or more memory units 260, and so forth.

The storage unit 230 can be configured to store computer program code that is necessary for carrying out the operations or functions of the cloud platform 210 and any of its components. The storage unit 230 can also be configured to store one or more applications, including 3D applications, which can be executed on the cloud platform 210. In addition or as an alternative to application program code, the storage unit 230 can be configured to store data, including for example 3D data.

The communication module 240 can be configured to enable data communication to and from the cloud platform. By way of example, examples of communication protocols which can be supported by the communication module 240 include, but are not limited to cellular communication (3G, 4G, etc.), wired communication protocols (such as Local Area Networking (LAN)), and wireless communication protocols, such as Wi-Fi, wireless personal area networking (PAN) such as Bluetooth, etc.

The one or more processors 250 can include one or more processing modules which are capable of processing software programs. The processing module can each have one or more processing units. In this description, the device processor 250 may include different types of processors which are implemented in the cloud platform 210, such as general purpose processing units, graphic processing units, physics processing units, etc. The device processor 250 or any of the processors which are generally referred to herein can have one or more cores, internal memory or a cache unit.

According to examples of the presently disclosed subject matter, the one or more memory units 260 may include several memory units. Each unit may be accessible by all of the one or more processors 250, or only by a subset of the one or more processors 250.

According to some examples of the presently disclosed subject matter, any processing unit, including the one or more processors 250 and/or any sub-components or CPU cores, etc. of the one or more processors 250, can be configured to read 3D images and/or frames of 3D video clips stored in storage unit 230, and/or to receive 3D images and/or frames of 3D video clips from an external source, for example through communication module 240, where, by a way of example, the communication module may be communicating with the mobile communication device 100, with another cloud platform, and so forth. By a way of example, the processing unit can be further configured to produce 3D models out of said 3D images and/or frames. Further by a way of example, the produced 3D models can be stored in storage unit 230, and/or sent to an external destination through communication module 240. According to further examples of the presently disclosed subject matter, any such processing unit can be configured to execute 3D registration on a plurality of 3D models.

Figure 3:
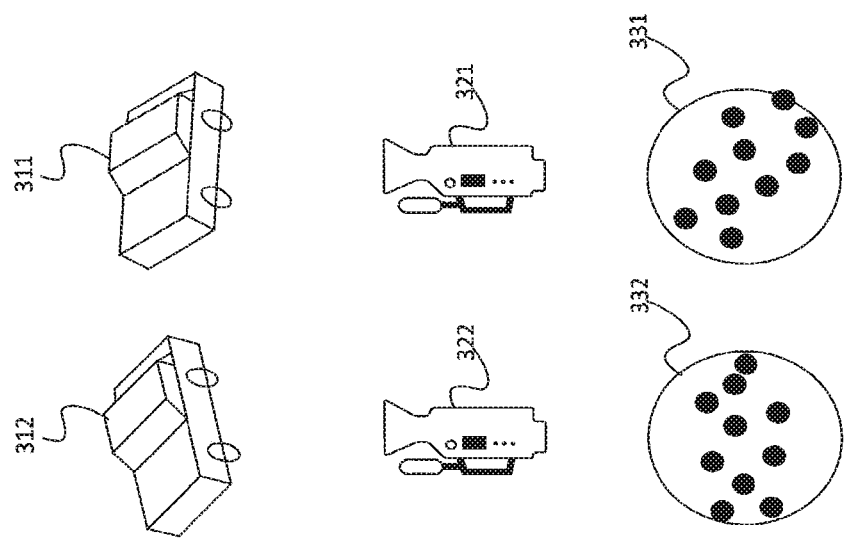
FIG. 3 is an illustration of a possible scenario in which a plurality of 3D models is generated by a single 3D camera.

FIG. 3 is an illustration of a possible scenario in which a plurality of 3D models is generated by a single 3D camera. A moving object is captured at two sequential points in time. Denote the earliest point in time as T1, and the later point in time as T2. 311 is the object at T1, and 312 is the object at T2. 321 is the single 3D camera at time T1, which generates a 3D model 331 of the object at time T1 (311). Similarly, at time T2 the single 3D camera (322) generates the 3D model 332 of the object (312).

According to further examples of the presently disclosed subject matter, 3D registration is used to align 3D model 331 with 3D model 332. Further by a way of example, the 3D registration result can be used to reconstruct the trajectory of the moving object 311 and 312.

Figure 4:
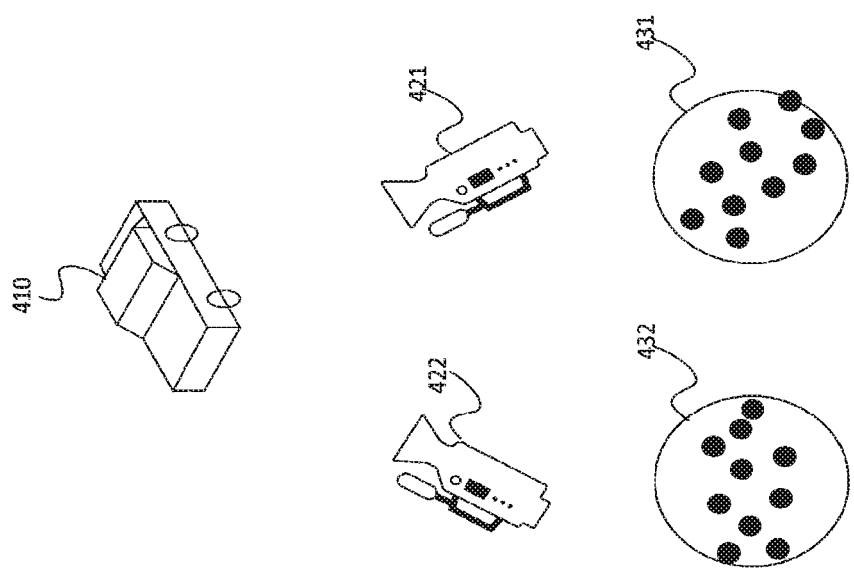
FIG. 4 is an illustration of a possible scenario in which a plurality of 3D models is generated by a plurality of 3D cameras.

FIG. 4 is an illustration of a possible scenario in which a plurality of 3D models is generated by a plurality of 3D cameras. A single object 410 is captured by two 3D cameras:

3D camera 421 generates the 3D model 431, and 3D camera 422 generates the 3D model 432.

According to further examples of the presently disclosed subject matter, 3D registration is used to align 3D model 431 with 3D model 432. Further by a way of example, the 3D registration result can be used to reconstruct a single combined 3D model of the object 410 from the two 3D models 431 and 432.

It is hereby assumed that a 3D model consists of a group of separated entities, possibly while holding additional information about the relations among the entities. For example: when representing the 3D model as a point cloud, an entity can be a point; when representing the 3D model as a group of polygons, the entity may be a polygon; when representing the 3D model as a skeleton model, each curve and/or a radii may be an entity; when representing the 3D model as a graph or a hypergraph, each node and/or vertex may be an entity; and so forth.

According to examples of the presently disclosed subject matter, for each entity, a set of parameters related to that entity are obtained. For example, for a polygon entity, the parameters may include: the normal to the polygon, the surface area of the polygon, the circumference of the polygon, and so forth. Further by a way of example, for a point cloud entity with points as entities, the parameters may include: the normal associated with the point entity in the point cloud, the distance between the point entity and the nearest other point in the point cloud, the density of points around the point entity in the point cloud, and so on. Further by a way of example, for a skeleton model with radii as entities, the parameters may include: the length of the radius entity, the orientation of the radii entity, the size of the adjacent curves, and so forth. Further by a way of example, other examples of parameters related to the entity include: accuracy estimation provided by the 3D model capturing process for this entity, the color histogram related to the entity, parameters extracted from a 2D image of a patch of a 2D image related to that entity, and so forth.

According to further examples of the presently disclosed subject matter, when a 3D registration result or an estimated 3D registration is available, the parameters related to an entity may be extracted from the neighborhood or region of the second 3D model that the entity is nearest to. According to further examples of the presently disclosed subject matter, in the case of an iterative 3D registration algorithm, parameters related to an entity may include information regarding the progress of the iterative 3D registration algorithm with regard to that entity.

According to examples of the presently disclosed subject matter, for each entity a subset of the 3D model's group of separated entities, which will be referred to hereafter as the entity neighborhood, is obtained. As a way of example, the entity neighborhood may be the entire group of separated entities. As another example, the entity neighborhood may be a subset containing only the entity itself. As another example, the entity neighborhood may include all entities within a specified radius from the entity. As another example, the entity neighborhood may be an empty subset. And so forth.

According to examples of the presently disclosed subject matter, for each entity a set containing all the sets of parameters relating to entities in the entity neighborhood is calculated, which will be referred to hereafter as the entity parameters' neighborhood. Meaning, that each entry in the entity parameters' neighborhood is a set of parameters, and that for each entity in the entity neighborhood there is a corresponding entry in the entity parameters' neighborhood and vice versa. Therefore, the number of entities in the entity neighborhood equals to the number of sets of parameters in the entity parameters' neighborhood.

According to examples of the presently disclosed subject matter, for each entity a crowdedness value is calculated, which will be referred to hereafter as the entity's crowdedness. According to further examples of the presently disclosed subject matter, the entity's crowdedness can be calculated as a measure related to the density of and/or around the parameters related to that entity, with respect to the entity parameters' neighborhood. Further by a way of example, a similarity and/or distance between the entity parameters and any other set of parameters in the entity parameters' neighborhood can be calculated. The density can be calculated as a function of these similarities and/or distances.

According to examples of the presently disclosed subject matter, assume a parameters' space, a mathematical space that contains all set of parameters as points. In other words, each set of parameters translates into a point in the parameters' space. Since each entity corresponds to a set of parameters, each entity also corresponds to a point in the parameters' space, which will be referred to hereafter as the entity's point. Further by a way of example, the density related to an entity can be calculated as the density of the entity's point, or a function of the entity's point density.

According to further examples of the presently disclosed subject matter, an entity parameters' neighborhood corresponds to a group of points in the parameters' space, which will be referred to hereafter as the entity's neighborhood points. Further by a way of example, the density related to an entity can be calculated as the density of the entity's point with respect to the entity's neighborhood points, or a function of the entity's point density with respect to the entity's neighborhood points. As a way of example, in order to calculate the density of the entity's point with respect to the entity's neighborhood points, the distance from the entity's point to any other point in the entity's neighborhood points is calculated, thereby ending with one distance for each point in the entity's neighborhood points. The density can be calculated as a function of these distances. For example, the number of distances lower than a certain threshold can be counted, and this count can serve as a measure of density. As another example, given n distances, a count is made for each threshold by counting the number of distances lower than this threshold, thereby producing n counts. The density can be calculated as a function of these counts. Further by a way of example, given two thresholds, the density can be calculated as the ratio between the two counts corresponding to the two thresholds. As another example, a weight can be calculated for each point in the entity's neighborhood points as a function of the distance corresponding to the point, for example, given a distance d, the similarity can be set to, $s=1/d$, or to $s=\exp(-d/a)$, where a is a scaling factor, and so forth. The density can be set to be a function of these similarities, for example, a sum of these similarities.

According to examples of the presently disclosed subject matter, each entity of the 3D model's group of separated entities can be assigned to one or more components based the entity's parameters, based on one or more assignment rules that are based on the set of parameters that relate to the entity. Therefore, each component is a subset of the 3D model's group of separated entities. Further by a way of example, each component corresponds to a component size, for example the component size is the number of entities assigned to that component. Further by a way of example, an entity's crowdedness can be calculated as the number of components the entity is assigned to. Further by a way of example, an entity's crowdedness can be calculated as a function of the component sizes of all the components which the entity is assigned to. Further by a way of example, the entity's crowdedness can be set to any statistical function of these component sizes, including the average size, the median size, the maximal size, the minimal size, and so forth.

According to further examples of the presently disclosed subject matter, each entity may be assigned to at most one component, meaning that the components are disjoint. Further by a way of example, an entity's crowdedness can be calculated as a function of the size of the single component the entity is assigned to. Further by a way of example, an entity's crowdedness can be calculated as an indicator that is 1 in case the entity is assigned to a component, and 0 otherwise.

According to examples of the presently disclosed subject matter, examples for assignment rule for assigning of the entities to components includes: when the parameters related to an entity are a normal vector, the assignment rule can be based on the normal vector orientation. For example, if the normal vector is represented in spherical coordinates as, ($\varphi$, $\theta$), and given two positive integers, n and m, we can define n×m components using the following rules, $$\frac{2\pi k}{n} \leq \varphi < \frac{2\pi(k+1)}{n}$$
$$\frac{\pi l}{m} \leq \theta < \frac{\pi(l+1)}{m}$$

where, $0 \leq k < n$, and, $0 \leq l < m$, are indices of the components. As another example, consider a polyhedron with t faces, centered around the axes origin, were each face correspond to a component, and an entity is assigned to a component if the ray that starts from the axes origin in the direction of the normal intersect with the face, and in case the normal interests with an edge, a corner or a vertex of the polyhedron, the entity is assigned to all components corresponding to faces adjacent to the intersected edge, corner or vertex. Further by a way of example, when the parameters related to an entity is a color, each component may correspond to a spectrum of colors, and the assignment rule can be to assign an entity for each component that correspond to a spectrum that include that color.

According to examples of the presently disclosed subject matter, given an entity's crowdedness, a weight for the entity is calculated, which will be referred to hereafter as the entity's weight. Further by a way of example, given an entity's crowdedness, r, the entity's weight can be calculated as, 1/r, as, exp(−r/a), where a is a scaling factor, and so forth.

According to further examples of the presently disclosed subject matter, a 3D registration algorithm is invoked on a plurality of 3D models, where at least one 3D model of the plurality of 3D models consists of a group of separated entities, possibly while holding additional information about the relations among the entities, and where the at least one 3D model is accompanied by entity's weight for all or some entities of the at least one 3D model.

According to examples of the presently disclosed subject matter, a sampling of the entities that is based on the entity's weight can be perform, thereby producing a new 3D model that consists only from the sample of the entity. By a way of example, the sample may be random, where the probability for sampling an entity is proportional to the entity's weight.

According to further examples of the presently disclosed subject matter, a 3D registration algorithm is invoked on the new 3D model that consist only from the sample of the entity, and on one or more 3D models.

According to examples of the presently disclosed subject matter, a sampling of the entities that is based on the components can be performed, thereby producing a new 3D model that consists only from the sample of the entity. By a way of example, the sample may be random, selecting a subset of entities from each component, where the number of entities sampled from each component is controlled by the size of the component. According to further examples of the presently disclosed subject matter, a 3D registration algorithm is invoked on the new 3D model that consist only from the sample of the entity, and on one or more 3D models.

In a further aspect, the above scheme can also be applied to 2D model. Assuming that the 2D model is constructed out of entities, a set of parameters can be calculated for each entity; a density may be calculated for each set of parameters; a crowdedness value can be calculated for each entity; entities can be assigned to components; weights can be calculated for the different entities; sampling can be performed based on these weights; and so forth.

The invention claimed is:

1. A method of processing a 3D model, the method comprising:
    obtaining a first 3D model comprising a first plurality of 3D points;
    selecting a 3D point from the first plurality of 3D points and determining a value of at least one parameter of the selected 3D point, wherein the value of the at least one parameter comprises an accuracy estimation value for the selected 3D point and a color histogram level associated with the selected 3D point;
    selecting a second plurality of 3D points, the second plurality of 3D points comprises 3D points selected from the first plurality of 3D points computing a density measure for the value of the at least one parameter of the selected 3D point, wherein the density measure corresponds to a density of the value among corresponding parameters of the second plurality of 3D points; and
    generating, based at least on the density measure for the value of the at least one parameter of the selected 3D point, a second 3D model comprising a third plurality of 3D points.

2. The method according to claim 1, wherein the third plurality of 3D points comprises fewer 3D points than the first plurality of 3D points.

3. The method according to claim 1, wherein the second plurality of 3D points is equal to the first plurality of 3D points.

4. The method according to claim 1, wherein the second plurality of 3D points comprises a subset of the first plurality of the 3D points.

5. The method according to claim 4, wherein the second plurality of 3D points comprises a plurality of 3D points neighboring the selected 3D point.

6. The method according to claim 1, wherein the at least one parameter of the selected 3D point is any parameter selected from a group consisting of: a depth or range value of the 3D point, a history of the selected 3D point registration results in at least one previous iteration of an iterative 3D registration algorithm, a distance between the 3D point and a nearest 3D point in the 3D model, a density of 3D points within a certain area of the 3D points, a surface area of a surface with which the selected 3D point is associated, and a circumference of surface with which the selected 3D point is associated.

7. The method according to claim 1, wherein computing a density measure for the value of the at least one parameter of the selected 3D point, comprises computing a similarity and/or a distance between the value of the at least one parameter of the selected 3D point and the value of a corresponding parameter of any one of the second plurality of 3D points.

8. The method according to claim 1, wherein a plurality of density measures are computed for the selected 3D point, wherein each one of the plurality of density measures is associated with a value from a set of values which are each associated with a different parameter of the selected 3D point.

9. The method according to claim 1, wherein the density measure for the selected 3D point is computed based on a plurality of values which are each associated with a common parameter of the selected 3D point.

10. The method according to claim 1, wherein the first 3D model is any one from a list consisting of: a point cloud, a range map, a polygon, a skeleton model.

11. A system for processing a 3D model, the system comprising:
at least one processor programmed to:
receive a first 3D model comprising a first plurality of 3D points;
select a 3D point from the first plurality of 3D points and determine a value of at least one parameter of the selected 3D point, wherein the value of the at least one parameter comprises an accuracy estimation value for the selected 3D point and a color histogram level associated with the selected 3D point;
select a second plurality of 3D points, the second plurality of 3D points comprises 3D points selected from the first plurality of 3D points compute a density measure for the value of the at least one parameter of the selected 3D point, wherein the density measure corresponds to a density of the value among corresponding parameters of the second plurality of 3D points; and
generate, based at least on the density measure for the value of the at least one parameter of the selected 3D point, a second 3D model comprising a third plurality of 3D points.

12. The system according to claim 11, wherein the third plurality of 3D points comprises fewer 3D points than the first plurality of 3D points.

13. The system according to claim 11, wherein the second plurality of 3D points is equal to the first plurality of 3D points.

14. The system according to claim 11, wherein the second plurality of 3D points comprises a subset of the first plurality of the 3D points.

15. The system according to claim 14, wherein the second plurality of 3D points comprises a plurality of 3D points neighboring the selected 3D point.

16. The system according to claim 11, wherein the at least one parameter of the selected 3D point is any parameter selected from a group consisting of: a depth or range value of the 3D point, a history of the selected 3D point registration results in at least one previous iteration of an iterative 3D registration algorithm, a distance between the 3D point and a nearest 3D point in the 3D model, a density of 3D points within a certain area of the 3D points, a surface area of a surface with which the selected 3D point is associated, and a circumference of surface with which the selected 3D point is associated.

17. The system according to claim 11, wherein the processor is programmed to compute the density measure for the value of the at least one parameter of the selected 3D point using a similarity and/or a distance between the value of the at least one parameter of the selected 3D point and the value of a corresponding parameter of any one of the second plurality of 3D points.

18. The system according to claim 11, wherein the processor is programmed to compute a plurality of density measures for the selected 3D point, wherein each one of the plurality of density measures is associated with a value from a set of values which are each associated with a different parameter of the selected 3D point.

19. The system according to claim 11, wherein the processor is programmed to compute the density measure for the value of the at least one parameter of the selected 3D point based on a plurality of values which are each associated with a common parameter of the selected 3D point.

20. The system according to claim 11, wherein the 3D model is any one from a list consisting of: a point cloud, a range map, a polygon, a skeleton model.

21. A method of processing a 3D model, the method comprising:
obtaining a first 3D model comprising a first plurality of 3D points;
selecting a 3D point from the first plurality of 3D points and determining a value of at least one parameter of the selected 3D point, wherein the value of the at least one parameter comprises an accuracy estimation value for the selected 3D point and a color histogram level associated with the selected 3D point;
selecting a second plurality of 3D points, the second plurality of 3D points comprises 3D points selected from the first plurality of 3D points computing a density measure for the value of the at least one parameter of the selected 3D point, wherein the density measure corresponds to a density of the value among corresponding parameters of the second plurality of 3D points; and
assigning a weight to at least the selected 3D point according to the computed density measure.

22. The method according to 21, further comprising obtaining a second 3D model, and preforming 3D registration of the first 3D model and the second 3D model, taking into account the weight assigned to the selected 3D point.

23. The method according to claim 22, wherein preforming 3D registration of the first 3D model and the second 3D model comprises including the selected 3D point in the 3D registration only if the weight that was assigned to the selected 3D point is above a certain threshold.

24. The method according to claim 21, wherein the third plurality of 3D points comprises fewer 3D points than the first plurality of 3D points.

25. The method according to claim 21, wherein the second plurality of 3D points is equal to the first plurality of 3D points.

26. The method according to claim 21, wherein the second plurality of 3D points comprises a subset of the first plurality of the 3D points.

27. The method according to claim 26, wherein the second plurality of 3D points comprises a plurality of 3D points neighboring the selected 3D point.

28. The method according to claim 21, wherein the at least one parameter of the selected 3D point is any parameter selected from a group consisting of: a depth or range value of the 3D point, a history of the selected 3D point registration results in at least one previous iteration of an iterative 3D registration algorithm, a distance between the 3D point and a nearest 3D point in the 3D model, a density of 3D points within a certain area of the 3D points, a surface area of a surface with which the selected 3D point is associated, and a circumference of surface with which the selected 3D point is associated.

29. The method according to claim 21, wherein computing a density measure for the value of the at least one parameter of the selected 3D point, comprises computing a similarity and/or a distance between the value of the at least one parameter of the selected 3D point and the value of a corresponding parameter of any one of the second plurality of 3D points.

30. The method according to claim 21, wherein a plurality of density measures are computed for the selected 3D point, wherein each one of the plurality of density measures is associated with a value from a set of values which are each associated with a different parameter of the selected 3D point.

31. The method according to claim 21, wherein the density measure for the selected 3D point is computed based on a plurality of values which are each associated with a common parameter of the selected 3D point.

32. The method according to claim 21, wherein the first 3D model is any one from a list consisting of: a point cloud, a range map, a polygon, a skeleton model.

33. A system for processing a 3D model, the system comprising:
at least one processor programmed to:
receive a first 3D model comprising a first plurality of 3D points;
select a 3D point from the first plurality of 3D points and determine a value of at least one parameter of the selected 3D point, wherein the value of the at least one parameter comprises an accuracy estimation value for the selected 3D point and a color histogram level associated with the selected 3D point;
select a second plurality of 3D points, the second plurality of 3D points comprises 3D points selected from the first plurality of 3D points;
compute a density measure for the value of the at least one parameter of the selected 3D point, wherein the density measure corresponds to a density of the value among corresponding parameters of the second plurality of 3D points; and
assign a weight to at least the selected 3D point according to the computed density measure.

34. The system according to 33, wherein the processor is further programmed to receive a second 3D model, and to perform 3D registration of the first 3D model and the second 3D model, taking into account the weight assigned to the selected 3D point.

35. The system according to claim 33, wherein the third plurality of 3D points comprises fewer 3D points than the first plurality of 3D points.

36. The system according to claim 33, wherein the second plurality of 3D points is equal to the first plurality of 3D points.

37. The system according to claim 33, wherein the second plurality of 3D points comprises a subset of the first plurality of the 3D points.

38. The system according to claim 37, wherein the second plurality of 3D points comprises a plurality of 3D points neighboring the selected 3D point.

39. The system according to claim 33, wherein the at least one parameter of the selected 3D point is any parameter selected from a group consisting of: a depth or range value of the 3D point, a history of the selected 3D point registration results in at least one previous iteration of an iterative 3D registration algorithm, a distance between the 3D point and a nearest 3D point in the 3D model, a density of 3D points within a certain area of the 3D points, a surface area of a surface with which the selected 3D point is associated, and a circumference of surface with which the selected 3D point is associated.

40. The system according to claim 33, wherein the processor is programmed to compute the density measure for the value of the at least one parameter of the selected 3D point using a similarity and/or a distance between the value of the at least one parameter of the selected 3D point and the value of a corresponding parameter of any one of the second plurality of 3D points.

41. The system according to claim 33, wherein the processor is programmed to compute a plurality of density measures for the selected 3D point, wherein each one of the plurality of density measures is associated with a value from a set of values which are each associated with a different parameter of the selected 3D point.

42. The system according to claim 33, wherein the processor is programmed to compute the density measure for the value of the at least one parameter of the selected 3D point based on a plurality of values which are each associated with a common parameter of the selected 3D point.

43. The system according to claim 33, wherein the 3D model is any one from a list consisting of: a point cloud, a range map, a polygon, a skeleton model.

* * * * *